United States Patent
Ju et al.

(10) Patent No.: US 12,500,287 B2
(45) Date of Patent: Dec. 16, 2025

(54) BATTERY PACK AND VEHICLE COMPRISING BATTERY PACK

(71) Applicant: LG Energy Solution, Ltd., Seoul (KR)

(72) Inventors: Eun-Ah Ju, Daejeon (KR); Sung-Won Seo, Daejeon (KR); Jae-Min Yoo, Daejeon (KR); Jeong-O Mun, Daejeon (KR); Yoon-Koo Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 684 days.

(21) Appl. No.: 17/623,711

(22) PCT Filed: Aug. 3, 2020

(86) PCT No.: PCT/KR2020/010216
§ 371 (c)(1),
(2) Date: Dec. 29, 2021

(87) PCT Pub. No.: WO2021/025410
PCT Pub. Date: Feb. 11, 2021

(65) Prior Publication Data
US 2022/0247010 A1    Aug. 4, 2022

(30) Foreign Application Priority Data
Aug. 2, 2019    (KR) .................. 10-2019-0094572

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 10/625* (2015.04);
(Continued)

(58) Field of Classification Search
CPC ........... H01M 10/6556; H01M 10/613; H01M 10/625; H01M 10/647; H01M 10/6554; H01M 2220/20
(Continued)

(56) References Cited

U.S. PATENT DOCUMENTS

2009/0061299 A1    3/2009   Uchida et al.
2012/0234613 A1    9/2012   Miyatake
(Continued)

FOREIGN PATENT DOCUMENTS

CN    105977582 A    9/2016
CN    108695458 A    10/2018
(Continued)

OTHER PUBLICATIONS

English language machine translation of "Battery Pack" by Hirano Hirokazu et al. in JP2013062023 (Year: 2013).*
(Continued)

*Primary Examiner* — Niki Bakhtiari
*Assistant Examiner* — Omar K Kekia
(74) *Attorney, Agent, or Firm* — Lerner David LLP

(57) ABSTRACT

A battery pack according to an embodiment of the present disclosure may includes a plurality of battery modules having at least one battery cell and having heatsink units respectively provided to upper and lower sides thereof. The heatsink unit may have a cooling channel through which a coolant flows. At least one crush beam may be provided between the plurality of battery modules. A pack tray configured to support the at least one crush beam and the plurality of battery modules may be provided. A plurality of drain holes may be provided in the pack tray to discharge the coolant out of the battery pack when the coolant leaks.

12 Claims, 7 Drawing Sheets

(51) Int. Cl.
*H01M 10/625* (2014.01)
*H01M 10/647* (2014.01)
*H01M 10/6554* (2014.01)

(52) U.S. Cl.
CPC ..... *H01M 10/647* (2015.04); *H01M 10/6554* (2015.04); *H01M 2220/20* (2013.01)

(58) Field of Classification Search
USPC .......................................................... 429/120
See application file for complete search history.

(56) References Cited

U.S. PATENT DOCUMENTS

| | | | |
|---|---|---|---|
| 2013/0266840 | A1 | 10/2013 | Fujii et al. |
| 2013/0309543 | A1 | 11/2013 | Kim et al. |
| 2016/0268657 | A1 | 9/2016 | Park et al. |
| 2017/0012330 | A1 | 1/2017 | Kim et al. |
| 2018/0053920 | A1 | 2/2018 | Seo et al. |
| 2019/0181405 | A1 | 6/2019 | Kim et al. |
| 2019/0326569 | A1 | 10/2019 | Chi et al. |
| 2019/0372182 | A1 | 12/2019 | Takayasu |
| 2020/0036066 | A1 | 1/2020 | Cho et al. |
| 2020/0058974 | A1* | 2/2020 | Lim .................. H01M 50/211 |
| 2020/0185672 | A1 | 6/2020 | Seo et al. |

FOREIGN PATENT DOCUMENTS

| | | | | |
|---|---|---|---|---|
| EP | 2955780 | A1 | 12/2015 | |
| EP | 3787098 | A1 | 3/2021 | |
| JP | 2009054403 | A | 3/2009 | |
| JP | 2010118497 | A | 5/2010 | |
| JP | 2013030275 | A | 2/2013 | |
| JP | 2013062023 | * | 4/2013 | .......... H01M 10/613 |
| JP | 2015041611 | A | 3/2015 | |
| KR | 101293989 | B1 | 8/2013 | |
| KR | 20150099965 | A | 9/2015 | |
| KR | 20170021122 | A | 2/2017 | |
| KR | 20170027545 | A | 3/2017 | |
| KR | 20180112618 | A | 10/2018 | |
| KR | 20180113906 | A | 10/2018 | |
| KR | 20190042804 | A | 4/2019 | |
| KR | 20190069873 | A | 6/2019 | |
| WO | 2011070758 | A1 | 6/2011 | |
| WO | 2017033412 | A1 | 3/2017 | |
| WO | 2018150672 | A1 | 8/2018 | |
| WO | 2019078456 | A1 | 4/2019 | |

OTHER PUBLICATIONS

Extended European Search Report including Written Opinion for Application No. 20850728.5 dated Sep. 29, 2022, pp. 1-7.
International Search Report for PCT/KR2020/010216 dated Nov. 23, 2020. 2 pgs.
Search Report dated Jun. 19, 2024 from the Office Action for Chinese Application No. 202080048394.1 Issued Jun. 20, 2024, pp. 1-2.

* cited by examiner

BATTERY PACK AND VEHICLE COMPRISING BATTERY PACK

CROSS-REFERENCE TO RELATED APPLICATIONS

The present application is a national phase entry under 35 U.S.C. § 371 of International Application No. PCT/KR2020/010216 filed on Aug. 3, 2020, which claims priority to Korean Patent Application No. 10-2019-0094572 filed on Aug. 2, 2019, in the Republic of Korea, the disclosures of which are incorporated herein by reference.

TECHNICAL FIELD

The present disclosure relates to a battery pack and a vehicle including the battery pack.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attention as a new energy source for enhancing energy efficiency and environment friendliness in that the use of fossil fuels can be reduced greatly, and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack or a battery rack by using at least one battery module and adding other components. Here, an energy storage system may be configured to include at least one battery rack, which includes at least one battery module, according to various voltage and capacity requirements.

In the case of the battery pack, recently, as the demand for a large-capacity battery pack increases, the demand for a battery pack having a slimmer and compact size and a greater energy density is increasing. Moreover, in the case of a large-capacity battery pack, cooling performance is also important, so it is also important to have high cooling efficiency.

Therefore, there is a need to provide a battery pack capable of improving both cooling efficiency and energy density, and a vehicle including the battery pack.

Disclosure

Technical Problem

The present disclosure is directed to providing a battery pack, which may improve both cooling efficiency and energy density, and a vehicle including the battery pack.

In addition, the present disclosure is also directed to providing a battery pack, which may prevent a coolant from flowing into a battery module when the coolant is leaked, and a vehicle including the battery pack.

Technical Solution

In one aspect of the present disclosure, there is provided a battery pack, comprising: a plurality of battery modules having at least one battery cell and having heatsink units respectively provided to upper and lower sides thereof, the heatsink unit having a cooling channel through which a coolant flows; at least one crush beam provided between the plurality of battery modules; a pack tray configured to support the at least one crush beam and the plurality of battery modules; and a plurality of drain holes provided in the pack tray to discharge the coolant out of the battery pack when the coolant leaks.

The plurality of drain holes may be formed in a bottom portion of a space between each battery module and the at least one crush beam.

In the space between each battery module and the at least one crush beam, a guide channel for guiding the coolant toward the plurality of drain holes when the coolant of the heatsink unit provided to the upper side of each battery module leaks may be formed.

The heatsink unit may include: a lower heatsink configured to support a lower side of the at least one battery cell and having a cooling channel formed therein so that the coolant flows therethrough; and an upper heatsink disposed opposite to the lower heatsink to support an upper side of the at least one battery cell and having a cooling channel formed therein so that the coolant flows therethrough.

Each of the plurality of battery modules may include: the at least one battery cell; the heatsink unit having the lower heatsink and the upper heatsink; and a pair of side plates disposed between the lower heatsink and the upper heatsink so that at least one of the pair of side plates faces the at least one crush beam.

At least one drain guide slit may be formed at the pair of side plates to face the plurality of drain holes.

The at least one drain guide slit may be elongated along a height direction of the pair of side plates.

The at least one drain guide slit may be formed to have a predetermined length along a length direction of the pair of side plates.

The drain guide slit may be provided in plural, and the plurality of drain guide slits may be provided in a number corresponding to the plurality of drain holes.

In addition, the present disclosure also provides a vehicle, comprising at least one battery pack according to the former embodiments.

Advantageous Effects

According to various embodiments as above, it is possible to provide a battery pack, which may improve both cooling efficiency and energy density, and a vehicle including the battery pack.

In addition, according to various embodiments as above, it is possible to provide a battery pack, which may prevent a coolant from flowing into a battery module when the coolant is leaked, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
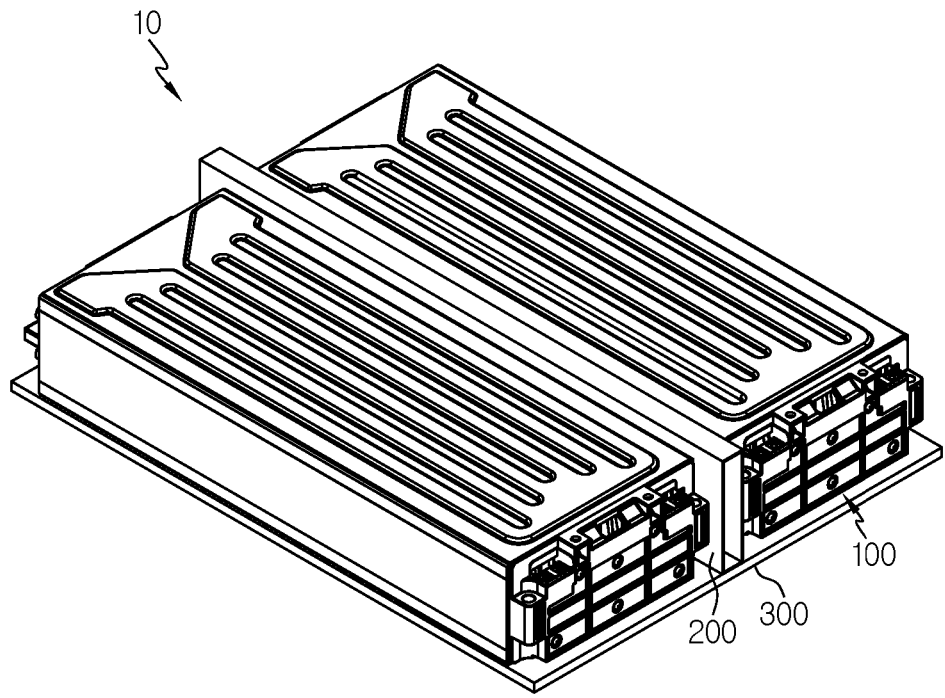
FIG. 1 is a perspective view of a battery pack according to an embodiment of the present disclosure.
Figure 2:
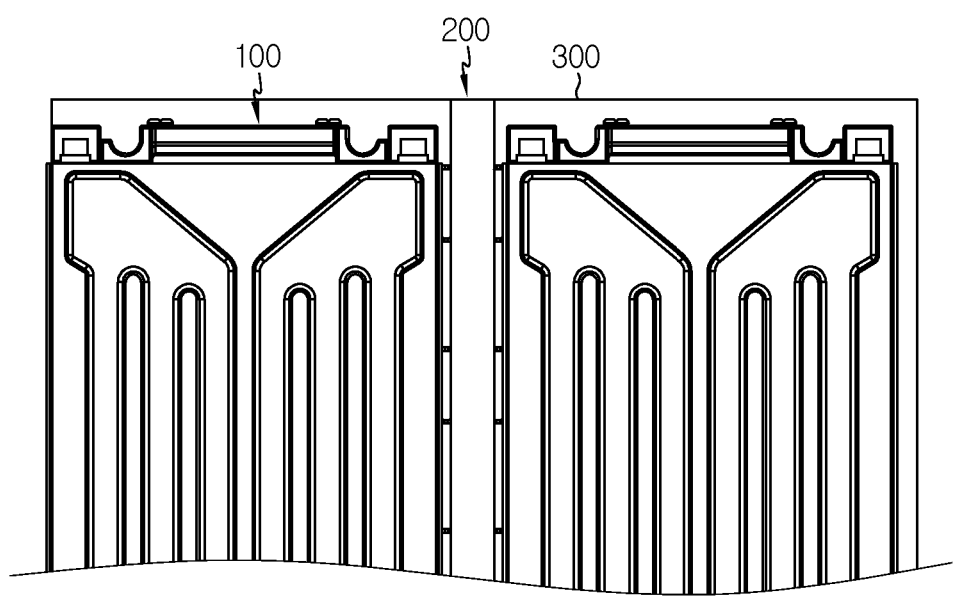
FIG. 2 is a partial plan view of the battery pack of FIG. 1.
Figure 3:
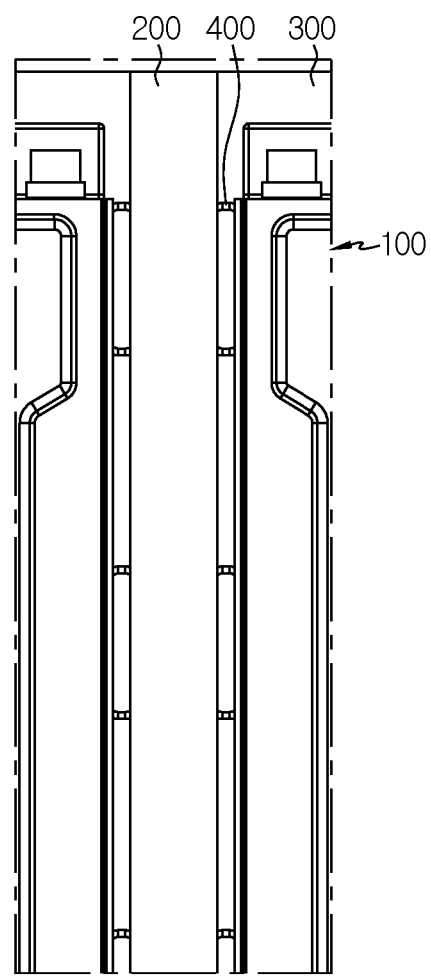
FIG. 3 is a partial detail view of the battery pack of FIG. 2.
Figure 4:
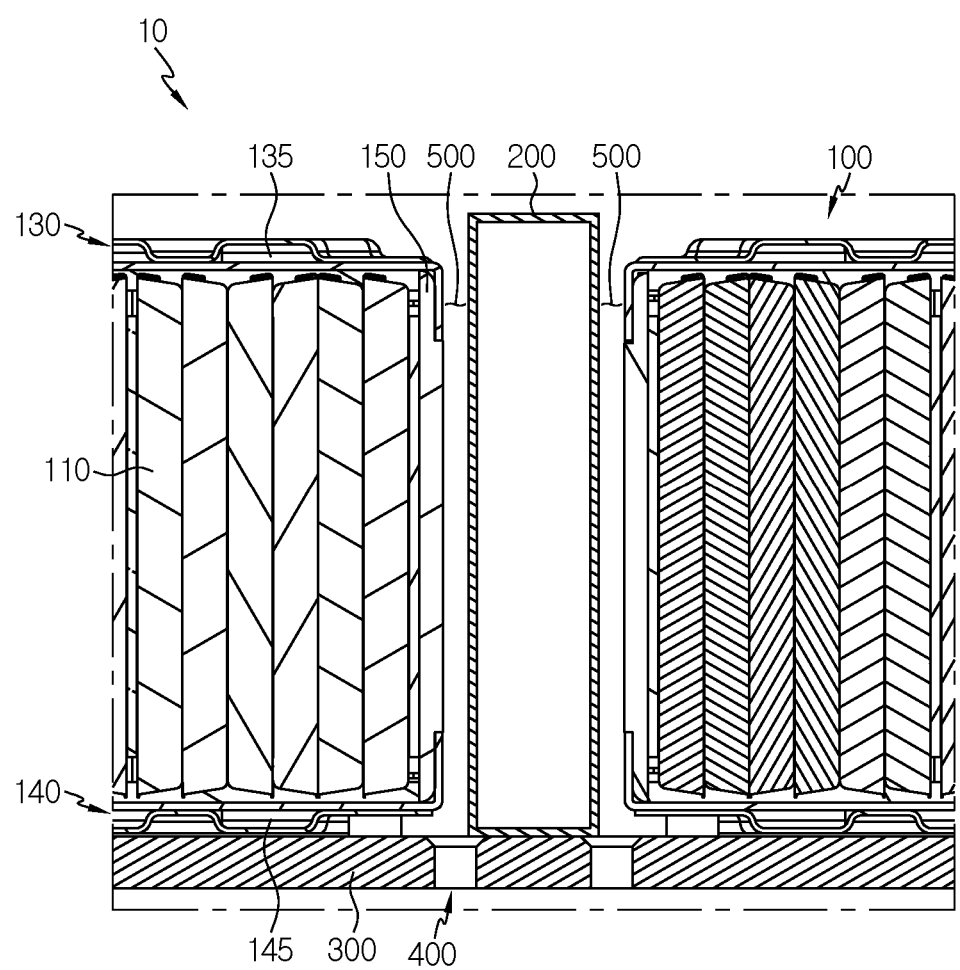
FIG. 4 is a cross-sectional view of the battery pack of FIG. 1.

FIG. 1 is a diagram for illustrating a battery pack according to an embodiment of the present disclosure, FIG. 2 is a plan view showing the battery pack of FIG. 1, FIG. 3 is a diagram for illustrating a main part of the battery pack of FIG. 2, and FIG. 4 is a sectional view showing a main part of the battery pack of FIG. 1.

Referring to FIGS. 1 to 4, a battery pack 10 may include a battery module 100, a crush beam 200, a pack tray 300, a drain hole 400, and a guide channel 500.

The battery module 100 may be provided in plural.

Each of the plurality of battery modules 100 may include a battery cell 110, a heatsink unit 130, 140, and a pair of side plates 150.

The battery cell 110 is a secondary battery and may be provided as a pouch-type secondary battery, a rectangular secondary battery, or a cylindrical secondary battery. Hereinafter, in this embodiment, the battery cell 110 will be described as a pouch-type secondary battery.

At least one battery cell 110 or a plurality of battery cells 110 may be provided. Hereinafter, in this embodiment, it will be described that the battery cell 110 is provided in plural.

The heatsink unit 130, 140 cools the plurality of battery cells 110 and may cover upper and lower sides of the plurality of battery cells 110. Here, the heatsink unit 130, 140 may directly cover the upper and lower sides of the plurality of battery cells 110, respectively, without any additional member.

In this embodiment, since the heatsink unit 130, 140 directly covers the upper and lower sides of the battery cells 110 without a separate member, the battery module 100 may be designed to be slimmer, and the energy density of the battery module 100 may be improved.

Moreover, in this embodiment, since the heatsink unit 130, 140 is respectively provided to the upper and lower sides of the battery cells 110 and directly covers the upper and lower sides of the battery cells 110, the cooling efficiency of the battery cells 110 may also be significantly improved.

The heatsink unit 130, 140 may include an upper heatsink 130 and a lower heatsink unit 140.

The upper heatsink 130 is disposed opposite to the lower heatsink unit 140, and may directly cover and support the upper side of the at least one battery cell 110, or the plurality of battery cells 110 in case of this embodiment. A cooling channel 135 through which a coolant for cooling the battery cells 110 flows may be provided in the upper heatsink 130.

The lower heatsink unit 140 may be disposed on a pack tray 300, explained later, to directly cover and support the lower side of the at least one battery cell 110, or the plurality of battery cells 110 in case of this embodiment. A cooling channel 145 through which a coolant for cooling the battery cells 110 flows may be provided in the lower heatsink unit 140.

The pair of side plates 150 are disposed between the upper heatsink 130 and the lower heatsink unit 140 and may be coupled to the upper heatsink 130 and the lower heatsink unit 140 to package the battery cells 110.

At least one of the pair of side plates 150 may be disposed to face the crush beam 200, explained later, and may be disposed to be spaced apart from the crush beam 200, explained later, by a predetermined distance.

The crush beam 200 is provided between the plurality of battery modules 100 and, specifically, may be disposed to face the side plates 150 of the plurality of battery modules 100. At least one crush beam 200 or a plurality of crush beams 200 may be provided.

When an impact occurs at the outside of the battery pack 10, the crush beam 200 may prevent the impact from being transferred to the battery module 100 or to buffer the impact.

The pack tray 300 may support the plurality of battery modules 100 and the at least one crush beam 200. The pack tray 300 may be mounted to a vehicle 1, explained later.

The drain hole 400 is provided in the pack tray 300, and when a coolant or the like leaks out of the heatsink unit 130, 140, the drain hole 400 may discharge the coolant out of the battery pack 10.

The drain hole 400 may be provided in plural. The plurality of drain holes 400 may be formed in a bottom portion of the space between each battery module 100 and the at least one crush beam 200.

The guide channel 500 may be formed in the space between each battery module 100 and the at least one crush beam 200. The guide channel 500 may guide the coolant toward the plurality of drain holes 400 when the coolant of the heatsink unit 130 provided at the upper side of each battery module 100, namely the upper heatsink 130, leaks.

Hereinafter, the drain structure for preventing the leaked coolant from flowing toward the battery cells 110 inside the battery module 100 when the coolant of the battery pack 10 according to this embodiment leaks will be described in more detail.

Figure 5:
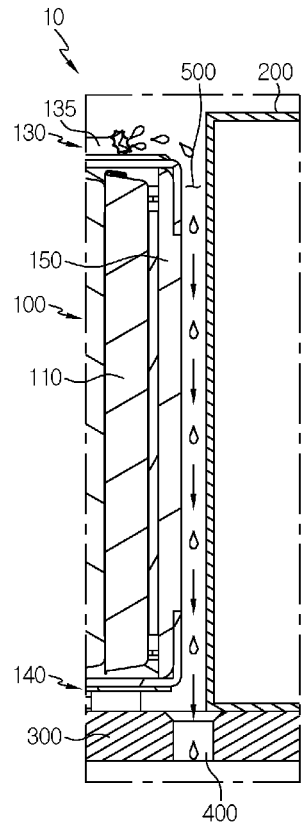
FIG. 5 is a partial detail view of a drain structure of the battery pack of FIG. 1.

FIG. 5 is a diagram for illustrating a drain structure for preventing a leaked coolant from flowing into a battery module when the coolant leaks in the battery pack of FIG. 1.

Referring to FIG. 5, in the battery pack 10, when an external shock or the like occurs, specifically, when the external shock or the like occurs in a portion not covered by the crush beam 200, in particular, the upper heatsink 130 of the heatsink unit 130, 140 may be damaged.

When the upper heatsink 130 is damaged, the coolant in the cooling channel 135 inside the upper heatsink 130 may leak out of the upper heatsink 130. In this case, if the leaked coolant flows into the battery cells 110 inside the battery module 100, the entire battery pack 10 including the battery module 100 may be damaged, so it is important to quickly discharge the leaked coolant out of the battery pack 10.

In this embodiment, if the coolant in the cooling channel 135 of the upper heatsink 130 leaks out of the upper heatsink 130, the coolant may be quickly guided toward the drain hole 400 through the guide channel 500 and discharged out of the battery pack 10.

Accordingly, in this embodiment, even if the coolant of the heatsink unit 130, 140 is leaked through the guide channel 500 and the drain hole 400, the leaked coolant may be quickly discharged out of the battery pack 10, so it is possible to effectively prevent the battery module 100 or the entire battery pack 10 from being damaged due to the coolant.

Figure 6:
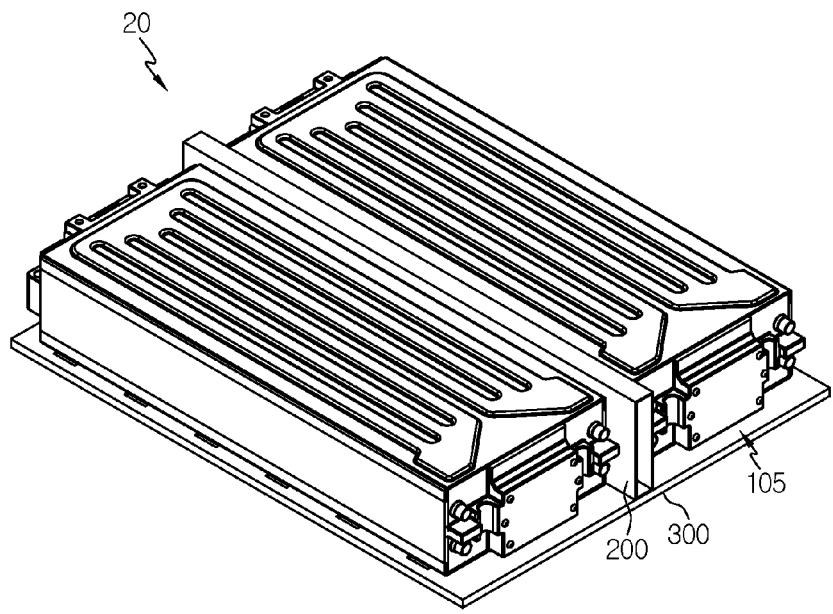
FIG. 6 is a perspective view of a battery pack according to another embodiment of the present disclosure.
Figure 7:
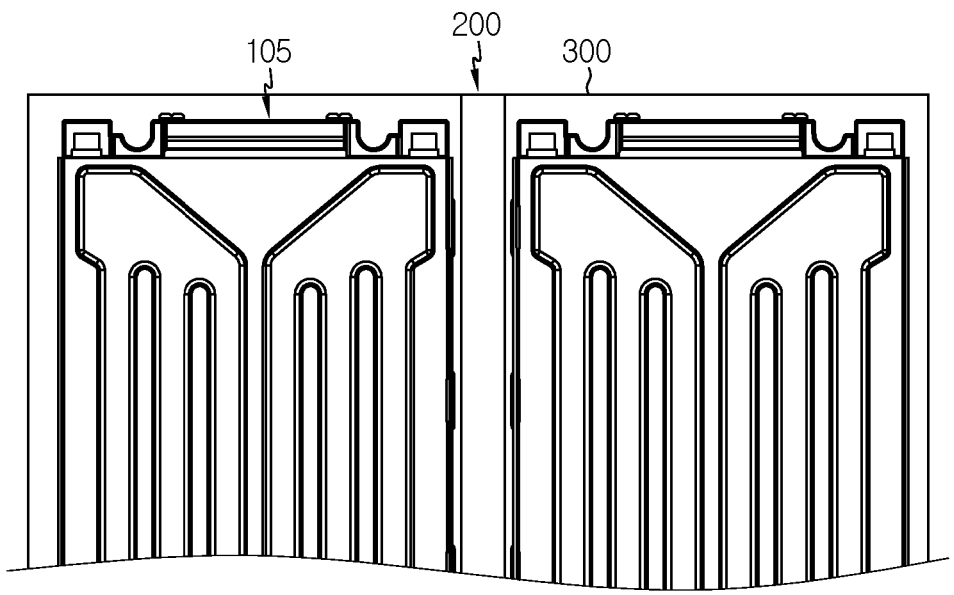
FIG. 7 is a partial plan view of the battery pack of FIG. 6.
Figure 8:
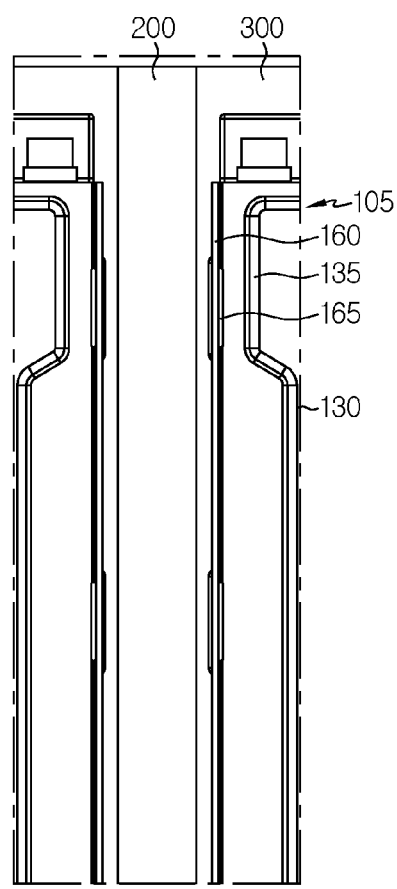
FIG. 8 is a partial detail view of the battery pack of FIG. 7.
Figure 9:
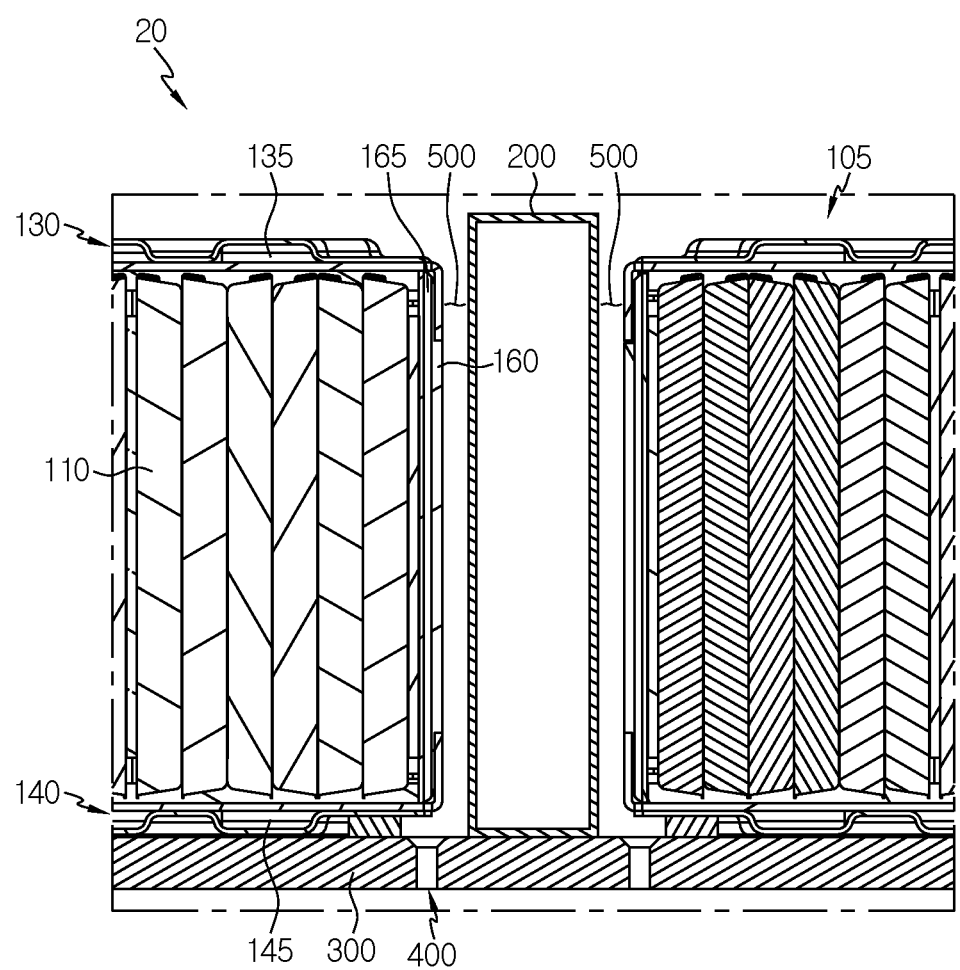
FIG. 9 is a cross-sectional view of the battery pack of FIG. 6.

FIG. 6 is a diagram for illustrating a battery pack according to another embodiment of the present disclosure, FIG. 7 is a plan view showing the battery pack of FIG. 6, FIG. 8 is a diagram for illustrating a main part of the battery pack of FIG. 7, and FIG. 9 is a sectional view showing a main part of the battery pack of FIG. 6.

A battery pack 20 according to this embodiment is similar to the battery pack 10 of the former embodiment, and thus, hereinafter, features substantially identical or similar to the former embodiment will not be described in detail, and features different from the former embodiment will be described in detail.

Referring to FIGS. 6 to 9, a battery pack 20 may include a battery module 105, a crush beam 200, a pack tray 300, a drain hole 400, and a guide channel 500.

The battery module 105 may be provided in plural.

Each of the plurality of battery modules 105 may include a plurality of battery cells 110, a heatsink unit 130, 140, and a pair of side plates 160.

The plurality of battery cells 110 and the heatsink unit 130, 140 are substantially identical or similar to those of the former embodiment and will not be described again.

A drain guide slit 165 may be formed in the pair of side plates 160.

The drain guide slit 165 is elongated along a height direction of the pair of side plates 160, and may be formed to have a predetermined length along a length direction of the pair of side plates 160.

At least one drain guide slit 165 or a plurality of drain guide slits 165 may be formed. Hereinafter, in this embodiment, it will be described that the drain guide slit 165 is formed in plural.

The plurality of drain guide slits 165 may be disposed to face a plurality of drain holes 400, explained later, and may be provided in a number corresponding to the plurality of drain holes 400, explained later.

The crush beam 200 and the pack tray 300 are substantially identical or similar to those of the former embodiment and thus will not be described again.

The drain hole 400 is provided in plural and may be formed in the pack tray 300. The plurality of drain holes 400 may be provided to a lower side of the plurality of drain guide slits 165, and may be provided in a number corresponding to the plurality of drain guide slits 165.

The guide channel 500 is substantially identical or similar to that of the former embodiment, and thus will not be described again.

Hereinafter, the drain structure for preventing the leaked coolant from flowing into the battery cells 110 inside the battery module 105 when the coolant of the battery pack 20 according to this embodiment is leaked will be described in more detail.

Figure 10:
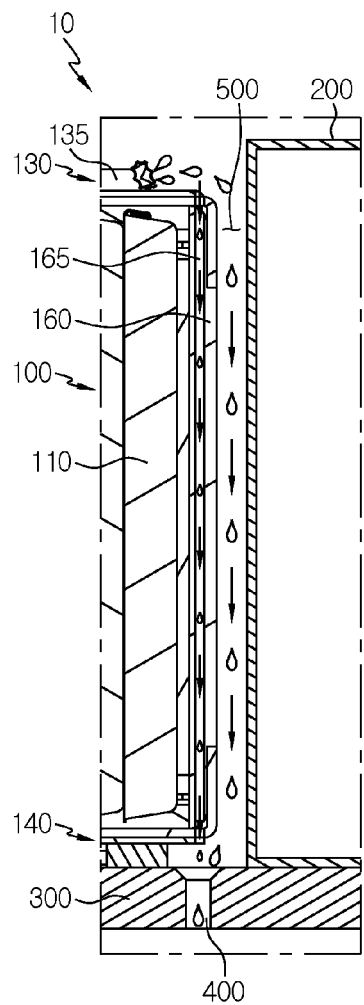
FIG. 10 is a partial detail view of a drain structure of the battery pack of FIG. 6.

FIG. 10 is a diagram for illustrating a drain structure for preventing a leaked coolant from flowing into a battery module when the coolant leaks in the battery pack of FIG. 6.

Referring to FIG. 10, in the battery pack 20, when the upper heatsink 130 is damaged, the coolant in the cooling channel 135 inside the upper heatsink 130 may leak out of the upper heatsink 130, as in the former embodiment.

In this embodiment, if the coolant in the cooling channel 135 of the upper heatsink 130 leaks out of the upper heatsink 130, the coolant may be guided to flow toward the drain hole 400 through not only the guide channel 500 but also the drain guide slits 165.

Accordingly, in this embodiment, the leaked coolant may be discharged out of the battery pack 20 more quickly and effectively through the drain guide slits 165 and the guide channel 500.

Figure 11:
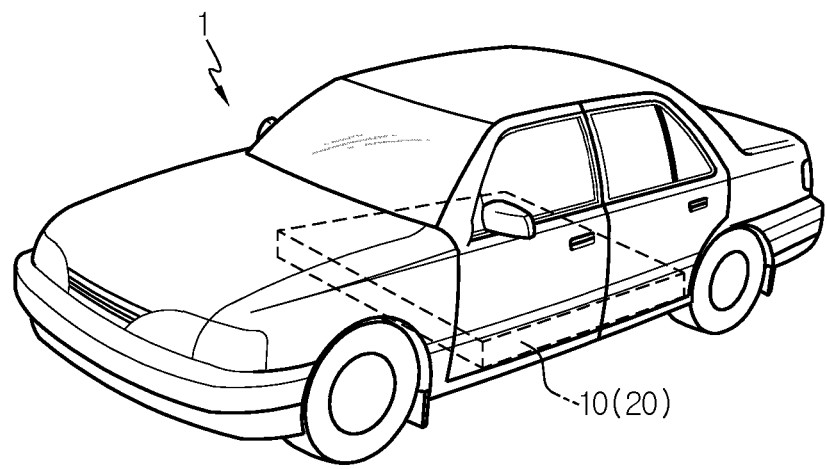
FIG. 11 is a schematic diagram of a vehicle according to an embodiment of the present disclosure.

FIG. 11 is a diagram for illustrating a vehicle according to an embodiment of the present disclosure.

Referring to FIG. 11, a vehicle 1 may include at least one battery pack 10, 20 of the former embodiment. The vehicle 1 may be an electric vehicle, a hybrid vehicle, or other vehicles including the battery pack 10, 20 as a fuel source.

Since the vehicle 1 according to this embodiment includes the battery pack 10, 20 of the former embodiment, it is possible to provide the vehicle 1 having all advantages of the battery pack 10, 20 of the former embodiment. Besides the vehicle 1, the battery pack 10, 20 may also be provided to an energy storage system, or other devices or appliances, using the battery pack 10, 20 as an energy source.

According to various embodiments as above, it is possible to provide the battery pack 10, 20, which may improve both cooling efficiency and energy density, and the vehicle 1 including the battery pack 10, 20.

In addition, according to various embodiments as above, it is possible to provide the battery pack 10, 20, which may prevent a coolant from flowing into the battery module 100, 105 when the coolant is leaked, and the vehicle including the battery pack 10, 20.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery pack, comprising:
a plurality of battery modules, each of the plurality of battery modules having at least one battery cell and heatsink units, a first heat sink of the heatsink units extending along an upper side of a battery module of the plurality of battery modules, and a second heatsink unit of the heatsink units extending along a lower side of the battery module, each of the heatsink units having a cooling channel including a coolant;

at least one crush beam between each of the plurality of battery modules;

a pack tray configured to support the at least one crush beam and the plurality of battery modules, the second heatsink unit extending between the lower side of the battery module and the pack tray;

a plurality of drain holes in the pack tray configured to discharge the coolant out of the battery pack when the coolant leaks, and a guide channel extending from the first heat sink to the second heat sink in a space between the battery module and the at least one crush beam, the guide channel configured to form a fluid conduit between the first heat sink and the second heat sink.

2. The battery pack according to claim 1, wherein the plurality of drain holes are located in a space between each battery module and the at least one crush beam.

3. The battery pack according to claim 2, wherein the guide channel is configured to guide the coolant toward the plurality of drain holes when the coolant of the heatsink units located on the upper side of the plurality of battery modules leaks.

4. The battery pack according to claim 2, wherein the second heatsink is configured to support the lower side of each of the plurality of battery modules, the second heatsink having a lower cooling channel to allow the coolant to flow therethrough, the first heatsink disposed opposite to the second heatsink and configured to support the upper side of each of the plurality of battery modules, the first heatsink having an upper cooling channel to allow the coolant to flow.

5. The battery pack according to claim 4, further including a pair of side plates disposed between the second heatsink and the first heatsink such that at least one of the pair of side plates faces the at least one crush beam.

6. The battery pack according to claim 5, wherein at least one drain guide slit is formed through each of the side plates, the at least one drain guide slit facing the plurality of drain holes.

7. The battery pack according to claim 6, wherein the at least one drain guide slit is elongated along a height direction of the pair of side plates.

8. The battery pack according to claim 6, wherein the at least one drain guide slit is formed to have a predetermined length along a length direction of the pair of side plates.

9. The battery pack according to claim 6, wherein the drain guide slit is provided in plural, a sum of the drain guide slits being equal to a sum of the drain holes.

10. A vehicle, comprising at least one battery pack according to claim 1.

11. A battery pack, comprising:

a plurality of battery modules, each of the plurality of battery modules having at least one battery cell and heatsink units, a first heat sink of the heatsink units extending along an upper side of a battery module of the plurality of battery modules, and a second heatsink unit of the heatsink units extending along a lower side of the battery module, each of the heatsink units having a cooling channel including a coolant;

at least one crush beam between each of the plurality of battery modules;

a pack tray configured to support the at least one crush beam and the plurality of battery modules, the second heatsink unit extending between the lower side of the battery module and the pack tray;

a plurality of drain holes in the pack tray configured to discharge the coolant out of the battery pack when the coolant leaks, and a guide channel extending from the first heat sink to the second heat sink, the guide channel configured to form a fluid conduit between the first heat sink and the second heat sink to guide leaked coolant from the first heat sink toward the plurality of drain holes.

12. A battery pack, comprising:

a plurality of battery modules, each of the plurality of battery modules having at least one battery cell and heatsink units, a first heat sink of the heatsink units extending along an upper side of a battery module of the plurality of battery modules, and a second heatsink unit of the heatsink units extending along a lower side of the battery module, each of the heatsink units having a cooling channel including a coolant;

at least one crush beam between each of the plurality of battery modules;

a pack tray configured to support the at least one crush beam and the plurality of battery modules, the second heatsink unit extending between the lower side of the battery module and the pack tray;

at least one drain hole in the pack tray configured to discharge the coolant out of the battery pack when the coolant leaks, and a guide channel extending from the first heat sink to the second heat sink in a space between the battery module and the at least one crush beam, the guide channel configured to form a fluid conduit between the first heat sink and the second heat sink to guide leaked coolant from the first heat sink toward the at least one drain hole.

* * * * *